C. W. MUELLER.
BIRD PERCH.
APPLICATION FILED APR. 3, 1918.
1,293,513. Patented Feb. 4, 1919.
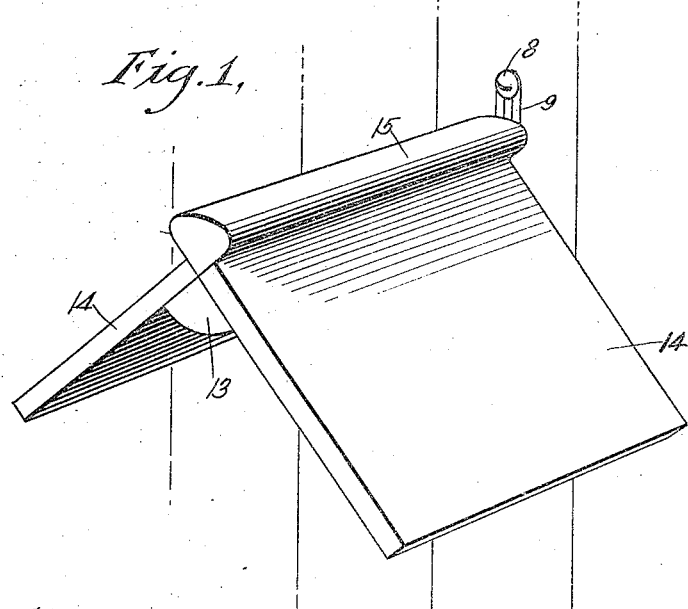
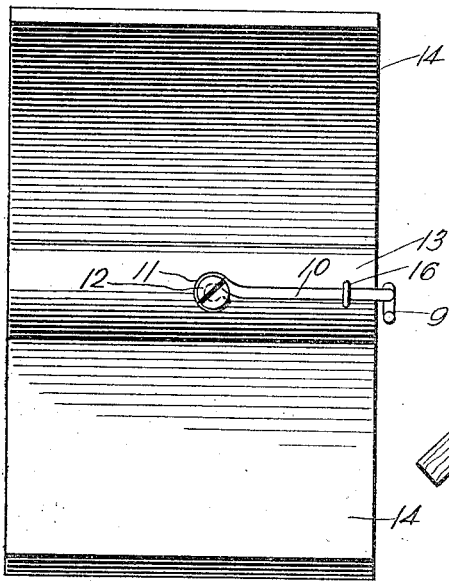
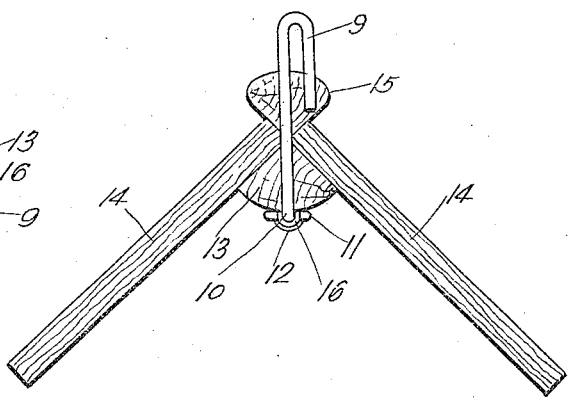
WITNESSES
Edw. Thorpe
INVENTOR
Charles W. Mueller
BY
ATTORNEYS

UNITED STATES PATENT OFFICE.

CHARLES W. MUELLER, OF JERSEY CITY, NEW JERSEY.

BIRD-PERCH.

1,293,513.  Specification of Letters Patent.  Patented Feb. 4, 1919.

Application filed April 3, 1918. Serial No. 226,463.

*To all whom it may concern:*

Be it known that I, CHARLES W. MUELLER, a citizen of the United States, and a resident of Jersey City, in the county of Hudson and State of New Jersey, have invented a new and Improved Bird-Perch, of which the following is a full, clear, and exact description.

Among the principal objects which the present invention has in view are: to provide a perch for birds which may be removed from the service position during the absence of the bird; to provide perches which may be arranged one above the other; and to simplify and cheapen the construction.

Drawings.

Figure 1 is a perspective view of a perch constructed and arranged in accordance with the present invention;

Fig. 2 is a plan view of the same seen from beneath;

Fig. 3 is an end edge view of the perch.

Description.

As seen in the drawings, the perch is suspended in service by a screw 8 or other suitable device. Fitting over the shank of the screw is a hook 9, which is formed of wire and is provided with an extension 10. As seen best in Fig. 2 of the drawings, the extension 10 has an eyelet 11, through which may be extended a screw 12, when the same is driven into a framing member 13. As seen best in Fig. 3 of the drawings, the framing member fills the angle between the shelves 14 extending from the perch bar 15 at opposite sides thereof to form shelters for birds when on perches disposed below the herein disclosed perch. The bar 15 and the framing member 13 are both preferably constructed from "quarter rounds" wood strips. The lateral edges of the bar 15 are rounded and overhang to afford a gripping surface for the talons or claws of the bird who uses the same as a perch.

The shelves 14, member 13 and bar 15 are secured by any suitable means. The extension 10 is held alined with the member 13 by a staple 16.

Perches constructed and arranged in accordance with the present invention when used in pigeon cotes or lofts, are removed from the screws 8 or other hanging devices when the birds who have acquired proprietorship to the perches are taken from the cote or loft, as, for instance, when homing or carrier pigeons are taken to a distant place and there liberated. The removal of the perch or perches avoids the confusion which often arises owing to the adoption of the perch of an absentee, by one of the remaining birds, who on the return of the absentee, objects to the surrender of the location.

Another advantageous use for perches of the character mentioned is to be found when transporting birds in railway vans or cars where permanent perches are not to be found and temporary perches are made. In such service the perches may be disposed one above the other in fairly close relation to economize space. In this position the shelves 14 serve as protection for the birds on the lower perches. They are particularly advantageous in military operations where the birds are employed as message carriers and regular facilities are provided for removing the birds from their homes at military headquarters to the temporary homes at the military service stations.

Claims.

1. A bird perch comprising a bar having overhanging sides adapted to be gripped by the bird's claws; a plurality of shelves rigidly connected therewith and laterally extended therefrom for forming a shelter for a bird below said perch; and a supporting member for hanging said perch in service.

2. A bird perch comprising a bar having overhanging sides adapted to be gripped by the bird's claws; a plurality of shelves rigidly connected therewith and laterally extended therefrom for forming a shelter for a bird below said perch; a supporting member for hanging said perch in service; and a framing member disposed between said shelves beneath the junction of the same to govern the disposition of said shelves in relation to each other.

3. A bird perch comprising a bar having overhanging sides adapted to be gripped by the bird's claws; a plurality of shelves rigidly connected therewith and laterally extended therefrom for forming a shelter for a bird below said perch; a framing member disposed between said shelves beneath the junction of the same to govern the disposition of said shelves in relation to each other; a hook-like member supporting member rigidly connected with said framing member; and means provided in said framing member for holding said hook.

CHARLES W. MUELLER.

Copies of this patent may be obtained for five cents each, by addressing the "Commissioner of Patents, Washington, D. C."